(12) United States Patent  
Tanabe et al.

(10) Patent No.: US 7,774,640 B2  
(45) Date of Patent: Aug. 10, 2010

(54) DISK ARRAY APPARATUS

(75) Inventors: Masayuki Tanabe, Odawara (JP); Takuya Okaki, Ooiso (JP)

(73) Assignee: Hitachi, Ltd., Chiyoda-ku, Tokyo (JP)

( * ) Notice: Subject to any disclaimer, the term of this patent is extended or adjusted under 35 U.S.C. 154(b) by 380 days.

(21) Appl. No.: 12/010,051

(22) Filed: Jan. 18, 2008

(65) Prior Publication Data

US 2008/0263394 A1 Oct. 23, 2008

(30) Foreign Application Priority Data

Apr. 18, 2007 (JP) .............................. 2007-109319

(51) Int. Cl.
*G06F 11/00* (2006.01)
(52) U.S. Cl. .............................................. 714/5; 714/7
(58) Field of Classification Search .................. 714/5–8, 714/42
See application file for complete search history.

(56) References Cited

U.S. PATENT DOCUMENTS

| | | | | |
|---|---|---|---|---|
| 5,627,990 A | * | 5/1997 | Cord et al. ................... | 711/122 |
| 5,666,482 A | * | 9/1997 | McClure ........................ | 714/8 |
| 5,712,970 A | * | 1/1998 | Arnott et al. ................... | 714/6 |
| 5,721,898 A | * | 2/1998 | Beardsley et al. .................. | 1/1 |
| 5,761,705 A | * | 6/1998 | DeKoning et al. ........... | 711/113 |
| 5,790,775 A | * | 8/1998 | Marks et al. .................... | 714/9 |
| 6,202,115 B1 | * | 3/2001 | Khosrowpour ............... | 710/312 |
| 2002/0078292 A1 | * | 6/2002 | Chilton ....................... | 710/305 |
| 2004/0153727 A1 | * | 8/2004 | Hicken et al. ................... | 714/6 |
| 2004/0236983 A1 | * | 11/2004 | Burton et al. ................... | 714/6 |
| 2005/0021906 A1 | * | 1/2005 | Nakamura et al. ........... | 711/113 |
| 2006/0064550 A1 | * | 3/2006 | Katsuragi et al. ............ | 711/141 |
| 2006/0248308 A1 | * | 11/2006 | Wang et al. .................. | 711/173 |
| 2006/0253651 A1 | * | 11/2006 | Inoue et al. .................. | 711/114 |
| 2008/0022163 A1 | * | 1/2008 | Tanaka et al. ................ | 714/710 |
| 2008/0040554 A1 | * | 2/2008 | Zhao et al. ................... | 711/133 |
| 2008/0263304 A1 | * | 10/2008 | Kaneda et al. ............... | 711/170 |
| 2010/0017650 A1 | * | 1/2010 | Chin et al. ...................... | 714/6 |
| 2010/0037102 A1 | * | 2/2010 | Chen et al. ...................... | 714/42 |

FOREIGN PATENT DOCUMENTS

| JP | 2005-174178 | 12/2003 |
|---|---|---|
| JP | 2006-092120 | 9/2004 |

\* cited by examiner

*Primary Examiner*—Bryce P Bonzo
(74) *Attorney, Agent, or Firm*—Volpe and Koenig, P.C.

(57) ABSTRACT

A disk array apparatus where, when a failure occurs at a part of a cache memory, a memory area of an I/O processing controller other than the memory area where the failure has occurred is utilized without taking over the whole I/O processing to an I/O processing controller of other system is provided, so that influence of performance degradation can be minimized. In a disk array apparatus including dual cache memories, when a failure occurs at a part of the cache memory, only a memory area where the failure has occurred is closed, and reallocation thereof to another memory area of the same cache memory is conducted to continue an I/O processing.

10 Claims, 12 Drawing Sheets

FIG. 4

LOGICAL MEMORY AREA MANAGEMENT TABLE

| MEMORY AREA # | I/O PROCESSING CONTROLLER | START MEMORY ADDRESS | TERMINATION MEMORY ADDRESS | FAIL bit |
|---|---|---|---|---|
| Area 1 | A | 0x00000 | 0x29999 | 1 |
| 2 | A | 0x30000 | 0x49999 | 0 |
| 3 | B | 0x00000 | 0x09999 | 0 |
| 4 | B | 0x10000 | 0x39999 | 0 |
| 5 | B | 0x40000 | 0x49999 | 0 |
| Area 1 MIRROR | B | 0x50000 | 0x79999 | 0 |
| 2 MIRROR | B | 0x80000 | 0x99999 | 0 |
| 3 MIRROR | A | 0x50000 | 0x59999 | 0 |
| 4 MIRROR | A | 0x60000 | 0x89999 | 0 |
| 5 MIRROR | A | 0x90000 | 0x99999 | 0 |

FIG. 5

LU INFORMATION MANAGEMENT TABLE

| LU# | DEFAULT LOGICAL MEMORY AREA | CURRENT LOGICAL MEMORY AREA | CONNECTION PORT 1 | CONNECTION PORT 2 | CONNECTION HOST | REDUNDANT PATH |
|---|---|---|---|---|---|---|
| LU1 | Area 1 | Area 2 | PORT A | — | HOST A | ABSENCE |
| 2 | 2 | 1 | A | PORT B | B | PRESENCE |
| 3 | 3 | 4 | B | A | B | PRESENCE |
| 4 | 4 | 5 | B | A | B | PRESENCE |
| 5 | 5 | 3 | B | A | B | PRESENCE |

DISK ARRAY APPARATUS

CROSS-REFERENCE TO RELATED APPLICATION

The present application claims priority from Japanese Patent Application No. JP 2007-109319 filed on Apr. 18, 2007, the content of which is hereby incorporated by reference into this application.

TECHNICAL FIELD OF THE INVENTION

The present invention relates to a technique for a disk array apparatus. More particularly, the present invention relates to a technique effectively applied to a technique for continuous I/O processing when a failure occurred at a part of dual cache memories in a disk array apparatus including the dual cache memories.

BACKGROUND OF THE INVENTION

According to the study by the inventors of the present invention, in a conventional disk array apparatus, there is a technique for adopting a redundant configuration between an I/O processing controller having a cache memory and an upper apparatus considering a case that a failure occurs in the cache memory. When a failure occurs at a part of the cache memory even in the redundant configuration, the I/O processing controller having the cache memory where the failure has occurred is closed and a processing is taken over to an I/O processing controller of another system where an I/O processing can be continued. Here, regarding a disk array apparatus with such a redundant configuration, techniques disclosed in Japanese Patent Application Laid-Open Publication No. 2005-174178 (Patent Document 1), Japanese Patent Application Laid-Open Publication No. 2006-92120 (Patent Document 2) are exemplified.

Meanwhile, in the technique of the disk array apparatus described above, since the I/O processing controller having the cache memory where the failure has occurred is closed to take over the processing to the I/O processing controller of another system when a failure has occurred at a part of a cache memory, the load due to the I/O processing is clustered to one I/O processing controller and it may result in performance degradation. In addition, when a path switching function to an upper apparatus is not provided, there occurs a problem that an I/O processing can not be taken over.

In addition, the technique described in Patent Document 1 has neither a concept about division of a cache memory into logical memory areas nor a concept of reallocation performed according to a connection state with an upper apparatus and a load status. The technique described in Patent Document 2 also does not have a concept of reallocation of the cache memory according to the connection and access status with an upper apparatus.

In view of these circumstances, an object of the present invention is to solve such a problem as described above and to provide a disk array apparatus where, when a failure has occurred at a part of a cache memory, a memory area of the I/O processing controller except for the memory area where the failure has occurred is utilized without taking over a whole I/O processing to an I/O processing controller of another system so that an influence of performance degradation can be minimized.

SUMMARY OF THE INVENTION

The typical ones of the inventions disclosed in this application will be briefly described as follows. That is, the present invention is a disk array apparatus including a dual cache memory where, when a failure has occurred at a part of the cache memory, only a memory area where the failure has occurred is closed and reallocated to another memory area of the same cache memory to continue the I/O processing.

In this case, one or both of presence/absence of a redundant path configuration between an upper apparatus and an I/O processing controller having a cache memory where a failure has occurred and a load state of a I/O processing controller other than the I/O processing controller having the cache memory where the failure has occurred are determined as an access state from the upper apparatus. When the redundant path configuration is not present, when the load is high, when the redundant path is not present and the load is high, when the redundant path is not present and the load is not high, or when the redundant path configuration is present and the load is high, reallocation to a memory area with a low usage rate is performed to continue the I/O processing.

Thereby, since it is unnecessary to close the whole cache memory where the failure has occurred, it is unnecessary to stop the access from the upper apparatus other than the access to the memory area where the failure has occurred.

The effects obtained by typical aspects of the present invention will be briefly described below. That is, according to the present invention, a disk array apparatus can be provided where, when a failure has occurred at a part of a cache memory array, a memory area other than the memory area where the failure of the I/O processing controller has occurred is utilized without taking over a whole I/O processing to an I/O processing controller of another system so that influence of performance degradation can be minimized.

BRIEF DESCRIPTIONS OF THE DRAWINGS

FIG. 4 is a diagram showing one example of a logical memory area management table in the disk array apparatus according to the embodiment of the present invention;

FIG. 5 is a diagram showing one example of a logical unit information management table in the disk array apparatus according to the embodiment of the present invention;

Figure 11:
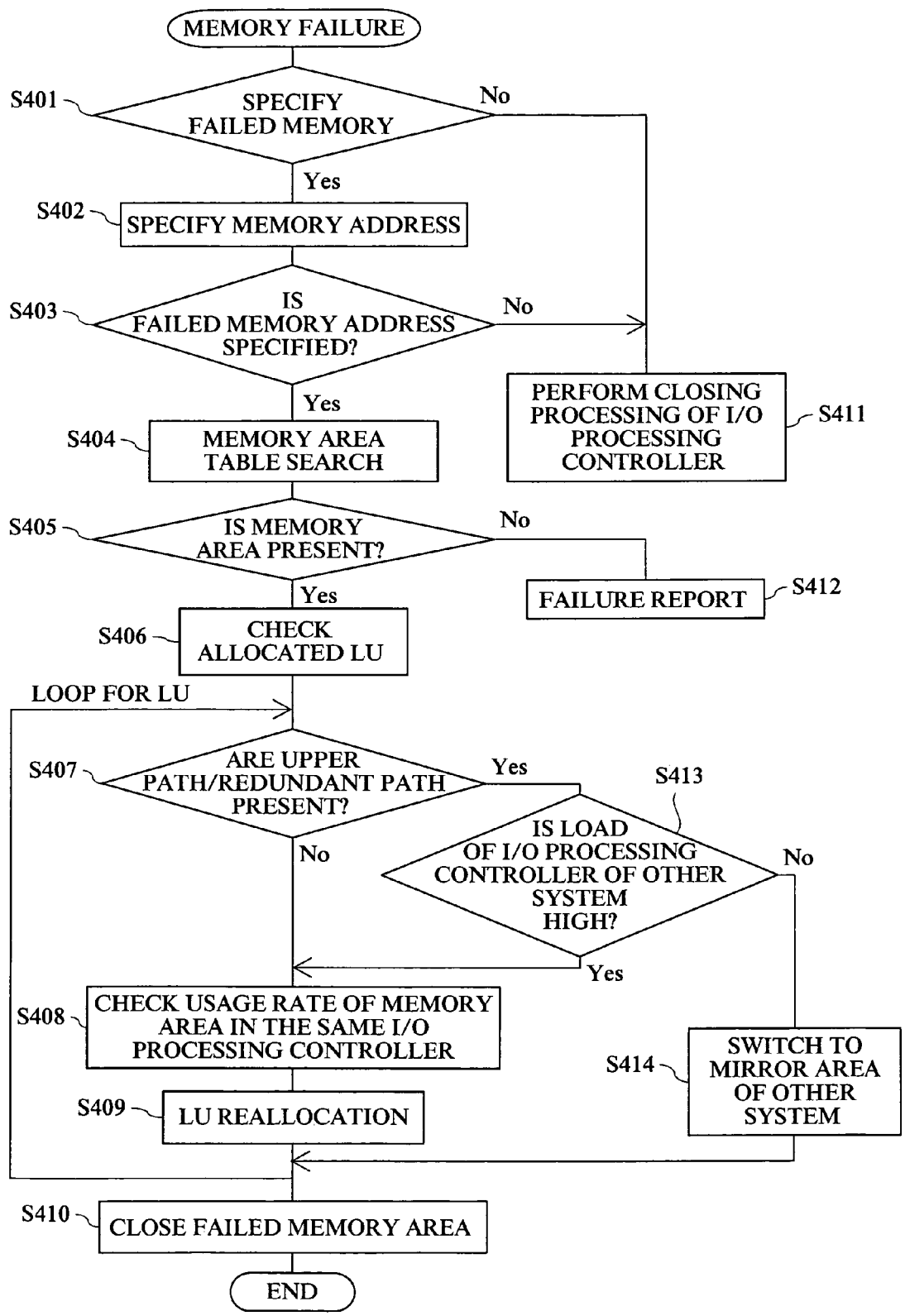
Figure 12:
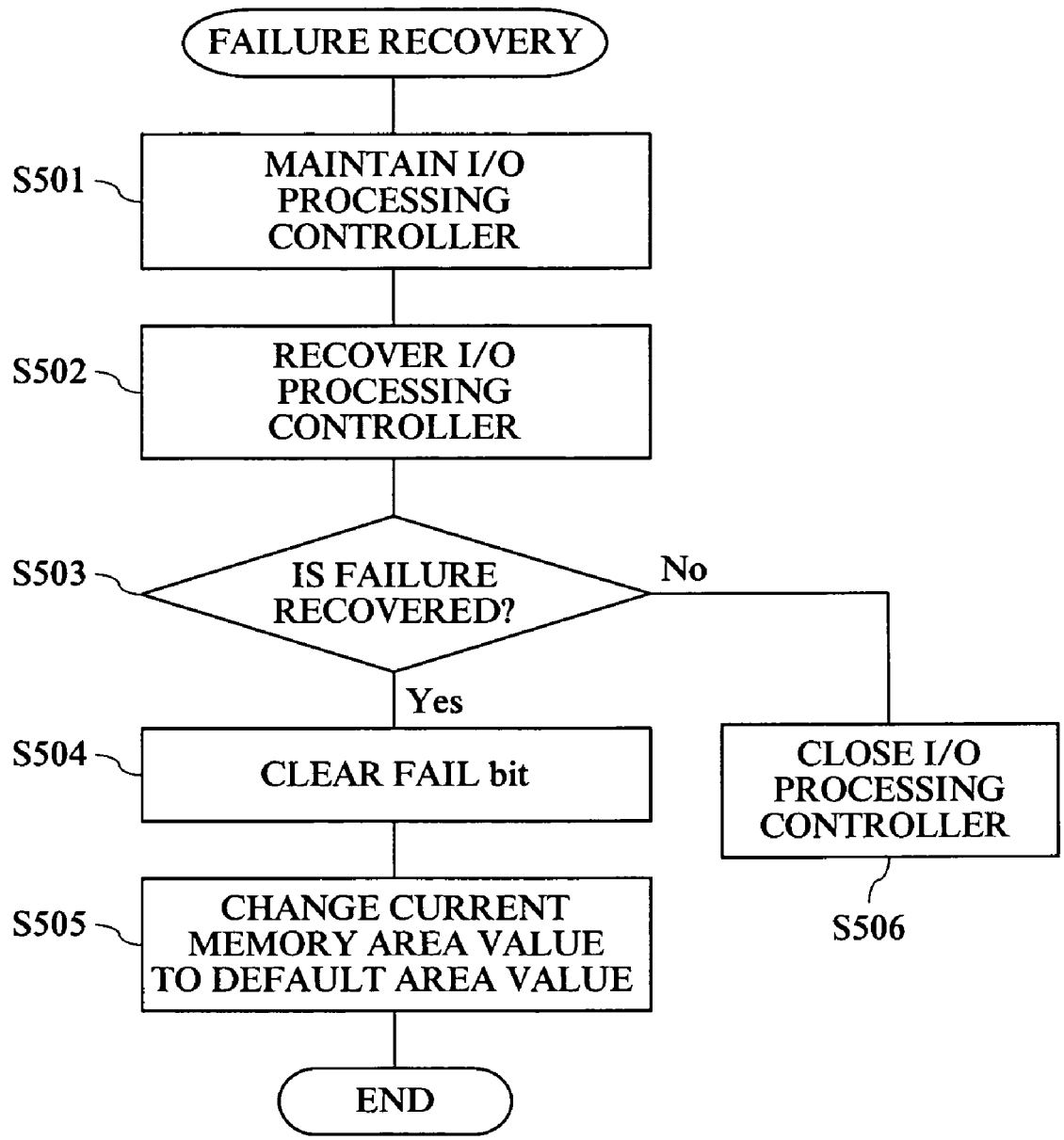

FIG. 11 is a diagram showing one example of a processing procedure when a failure has occurred at a part of a cache memory in the disk array apparatus according to the embodiment of the present invention; and FIG. 12 is a diagram showing one example of a processing procedure for returning allocation to a memory area in a fail recovery in the disk array apparatus according to the embodiment of the present invention.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

<Configuration of Disk Array Apparatus>

Figure 1:
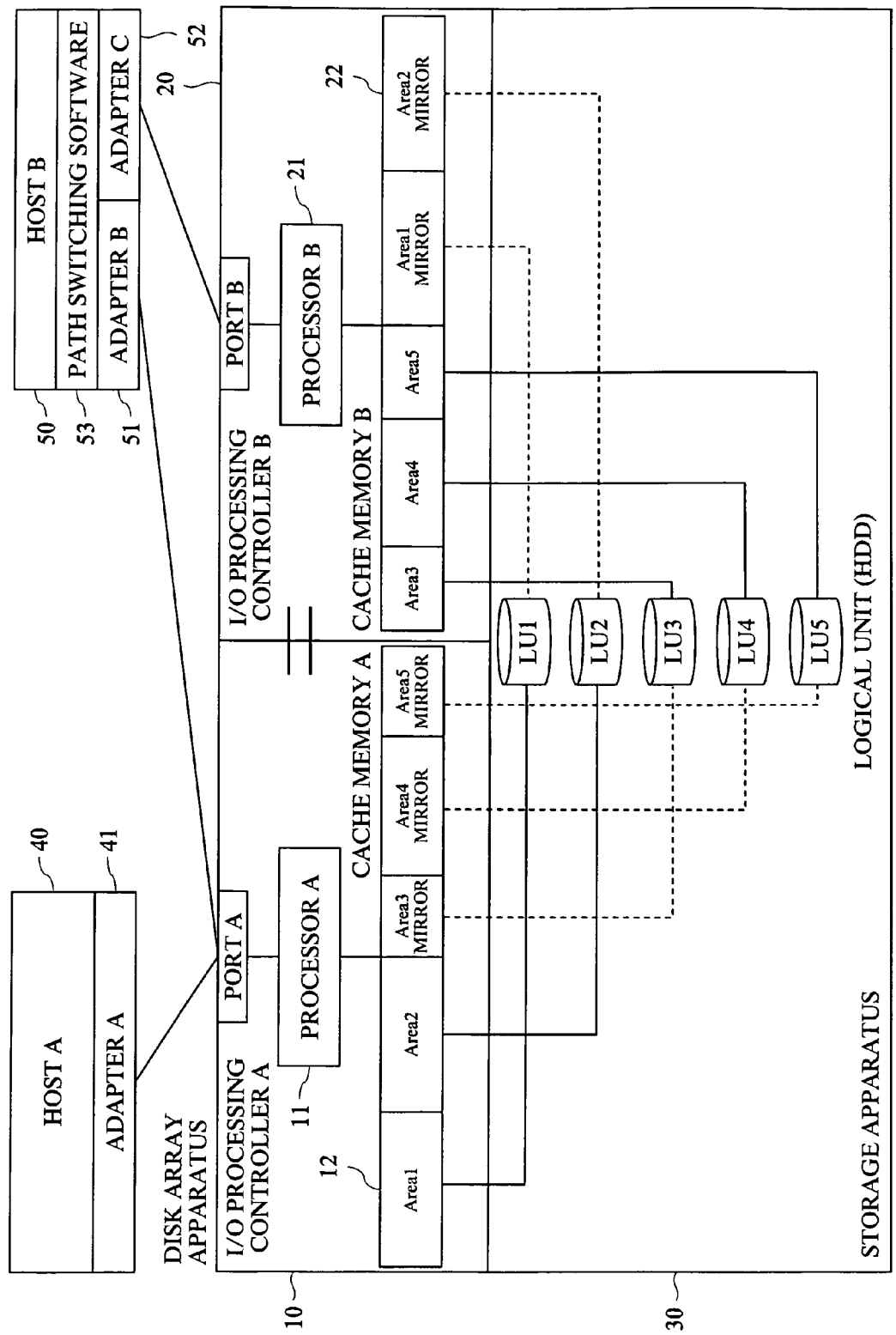
FIG. 1 is a diagram showing one example of a configuration of a disk array apparatus according to an embodiment of the present invention.

With reference to FIG. 1, one example of configuration of a disk array apparatus according to an embodiment of the present invention will be described. FIG. 1 is a diagram showing a configuration of the disk array apparatus.

The disk array apparatus according to the present embodiment includes a plurality of (two in FIG. 1 for example) I/O processing controllers A (10) and B (20) for controlling I/O processings between the controllers and an upper apparatus, a storage apparatus 30 including a plurality of HDDs (hard disks) to store data obtained by I/O processings performed by these I/O processing controllers 10 and 20, and the like. A host A (40) and a host B (50) are connected to the upper-level of the disk array apparatus as the upper apparatuses.

The respective I/O processing controllers 10 and 20 include processors A (11) and B (21) for performing I/O processings including read/write operations to the HDDs in the storage apparatus 30 according to instructions from the hosts 40 and 50, and cache memories A (12) and B (22) temporarily storing data obtained by I/O processings including read/write operations performed by the processors 11 and 21, and the like.

Each of the cache memories 12 and 22 is logically divided into a plurality of (five in FIG. 1 for example) memory areas. In one cache memory 12, mirror data obtained by reproducing data of Area3, Area4, and Area5 of the other cache memory 22 is stored in Area3 mirror, Area4 mirror, and Area5 mirror of the five memory areas. In another cache memory 22, data obtained by replicating in Area1 and Area2 of the one cache memory 12 is stored in Area1 mirror and Area2 mirror of the five memory areas.

The storage apparatus 30 includes a plurality of (five in FIG. 1 for example) logical units LU1 to LU5. The logical units LU1 to LU5 comprise a plurality of HDDs that are recognized as physical devices from the hosts 40 and 50. The respective logical units LU1 to LU5 are allocated with the divided memory areas of the respective cache memories 12 and 22 for each logical unit. The logical unit LU1 and LU2 are respectively allocated with Area1 and Area2 of the cache memory 12 by a primary path and they are allocated with Area1 mirror and Area2 mirror of the cache memory 22 by a secondary path. The logical units LU3, LU4, and LU5 are allocated with Area3, Area4, and Area5 of the cache memory 22 by the primary path, respectively, and they are allocated with Area3 mirror, Area4 mirror, and Area5 mirror of the cache memory 12 by the secondary path.

The host 40 is provided with an adapter A (41) that performs data transfer including a read/write operation to the disk array apparatus. The adapter 41 is connected to a port A of the I/O processing controller 10. The host 50 is provided with two adapters B (51) and C (52), and it is different from the host 40. The adapters 51 and 52 are switched from one to another according to execution of a path switching software 53. Regarding the adapters 51 and 52, the adapter 51 is connected to the port A of the I/O processing controller 10 while the adapter 52 is connected to a port B of the I/O processing controller 20.

<Normal Operation of Disk Array Apparatus>

Figure 2:
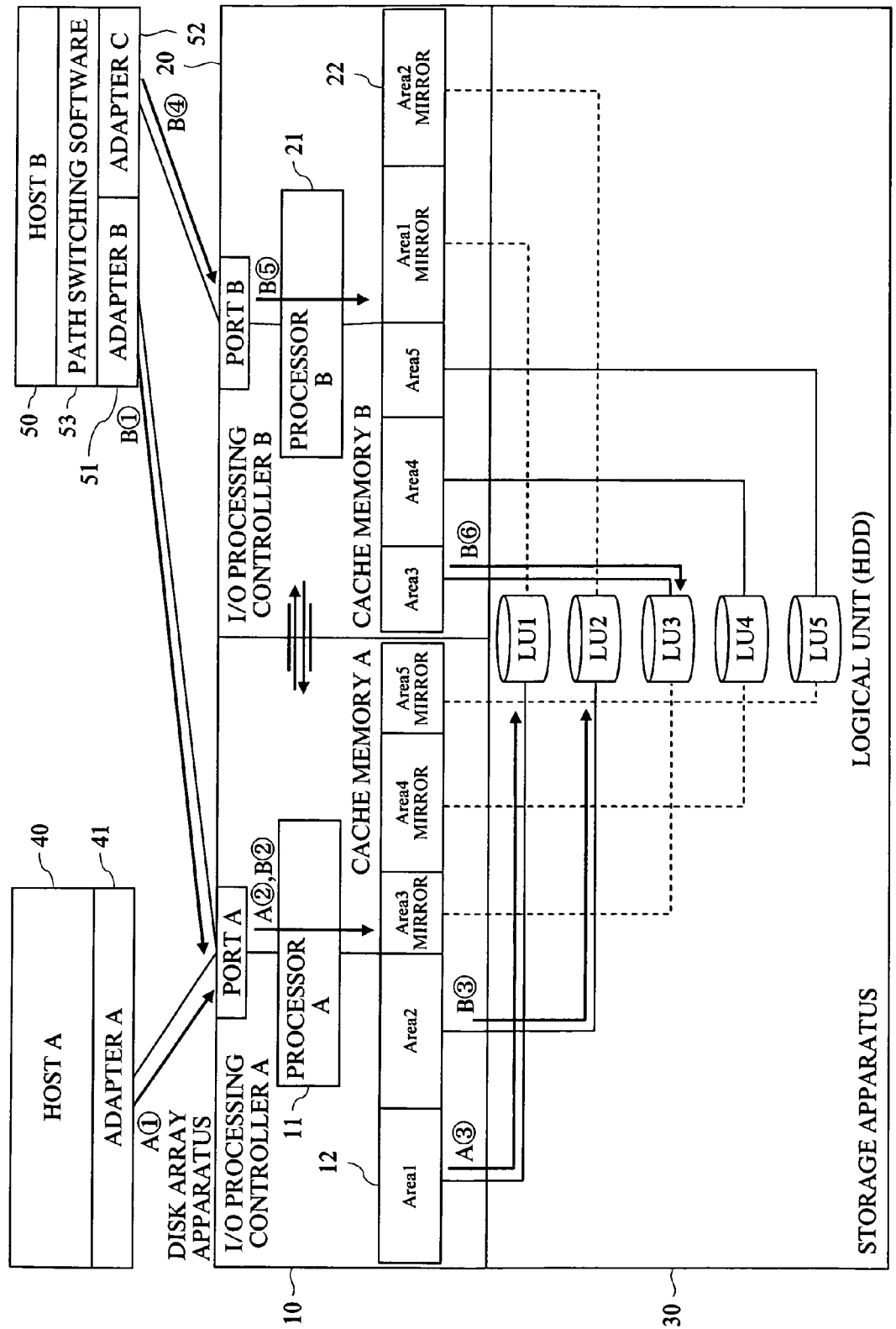
FIG. 2 is a diagram showing one example of an input/output route in a normal operation in the disk array apparatus according to the embodiment of the present invention.

With reference to FIG. 2, one example of an input/output route in a normal operation in the disk array apparatus shown in FIG. 1 will be described. FIG. 2 is a diagram showing one example of an input/output route in the ordinary operation.

When access of an I/O processing including read/write operation is requested from the host A (40), the I/O route is accessed from the adapter A (41) of the host 40 to the port A of the I/O processing controller A (10), and becomes a route from the port A to the logical unit LU1 via the processor A (11) and the memory area Area1 of the cache memory A (12).

When access for an I/O processing including read/write operation from the host B (50) is made, the I/O route has a case that the access is performed from the adapter B (51) of the host 50 to the port A of the I/O processing controller A (10) and a case that the access is performed from the adapter C (52) to the port B of the I/O processing controller B (20). When the port A of the I/O processing controller A (10) is accessed, a route from the port A to the logical unit LU2 via the processor A (11) and the memory area Area2 of the cache memory A (12) is formed. When the port B of the I/O processing controller B (20) is accessed, a route from the port B to the logical unit LU3 via the processor B (21) and the memory area Area3 of the cache memory B (22) is formed.

In the I/O processing, the processor 11 or 21 examines whether or not data to be read is present in the cache memory 12 or 22, for example, in the read operation. When the data to be read is present in the cache memory 12 or 22, the processor 11 or 21 transmits the data to the host 40 or 50. On the other hand, when the data to be read is not present in the cache memory 12 or 22, the processor 11 or 21 reads data to be read from the logical units LU1 to LU5 of the storage apparatus 30 to write the data in the cache memory 12 or 22. The processor 11 and 21 transmit data written in the cache memory 12 or 22 to the host 40 or 50.

In the write operation, the processor 11 or 21 writes write data received from the host 40 or 50 in the cache memory 12 or 22. The processor 11 and 21 reads the written write data from the cache memory 12 or 22 to write the same in the logical units LU1 to LU5 of the storage apparatus 30.

In this manner, in the I/O processing including a read/write operation from the host 40 or 50, transmission and reception of read data from the logical units LU1 to LU5 of the storage apparatus 30 and write data in the logical units LU1 to LU5 of the storage apparatus 30 are performed via the cache memory 12 or 22.

<Processing for Division of Logical Memory Area and Allocation of Logical Units>

Figure 3:
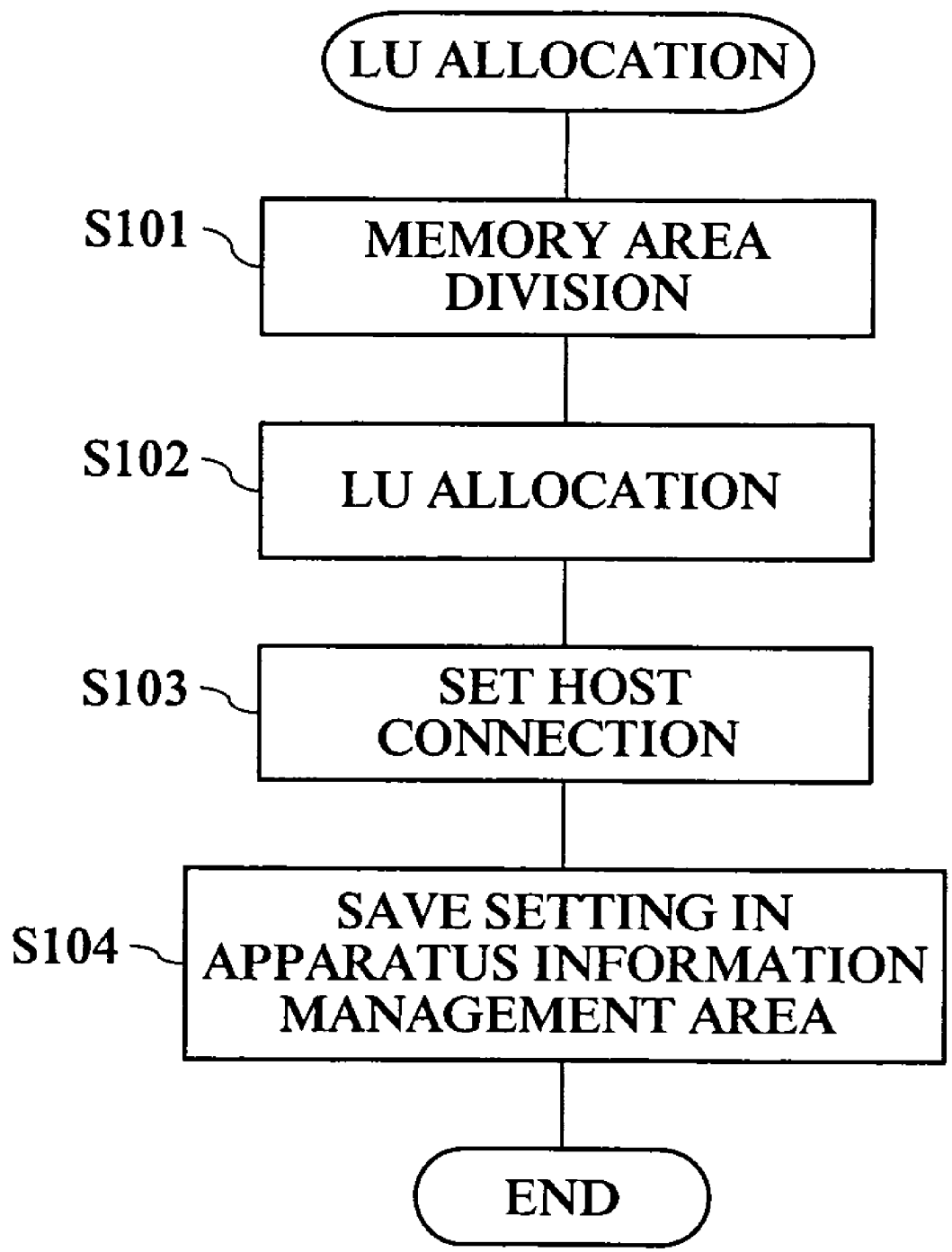
FIG. 3 is a flowchart showing one example of a procedure of a processing for division of logical memory area and allocation of logical units in the disk array apparatus according to the embodiment of the present invention.

With reference to FIG. 3 to FIG. 5, one example of processing for division of logical memory areas and allocation of logical units will be described. FIG. 3 is a diagram showing one example of procedure of the processing for division of logical memory areas and allocation of logical units, FIG. 4 is a diagram showing one example of logical memory area management table, and FIG. 5 is a diagram showing one example of logical unit information management table. The processing for division of the logical memory area and allocation of logical units is performed using a setting tool provided in the host.

In FIG. 3, first, the memory areas in the cache memories 12 and 22 are logically divided using the setting tool (S101). In this case, logical memory areas are created. In this setting, sizes of the logical memory areas are designated and start memory addresses and termination memory addresses of the memory areas are managed.

Subsequently, logical units are allocated to the created logical memory areas (S102). Further, a setting regarding from which port of a disk array apparatus and to which host a logical unit should be connected is done (S103). After respective items have been set, the set contents are stored in apparatus information managing areas in the processors 11 and 21 as a logical memory area management table and a logical unit information management table (S104).

As shown in FIG. 4, the logical memory area management table includes respective items of memory area #, I/O processing controller, start memory address, termination memory address, and fail bit. The logical memory areas of the cache memories 12 and 22 are managed based on the logical memory area management table. As the fail bit, "1" is set in a memory area in a closed state while "0" is set in a memory area in a normal state. When a memory area is set in the closed state, the memory area is disabled in an I/O processing from a host.

In the example shown in FIG. 1, for example, Area1, Area2, Area3, Area4, Area5, Area1 mirror, Area2 mirror, Area3 mirror, Area4 mirror, and Area5 mirror are set in the memory area #. The Area1 is present in the I/O processing controller A, it is a memory area from start memory address "0x00000" to termination memory address "0x29999," and it is in a closed state of fail bit "1." The example of Area1 corresponds to a case to be described below (FIG. 6) that a failure has occurred at Area1 and Area1 is closed. Area2 is present in the I/O processing controller A, it is a memory area from start memory address "0x30000" to termination memory address "0x49999," and it is in a normal state of fail bit "0." The others are shown in FIG. 4.

As shown in FIG. 5, the logical unit (LU) information management table includes respective items of LU#, default logical memory area, current logical memory area, connection port 1, connection port 2, connection host, and redundant path, and LUs of the storage apparatus is managed based on the LU information management table. Referring to the current logical memory area, a set memory area is used for I/O processing from the host.

Figure 6:
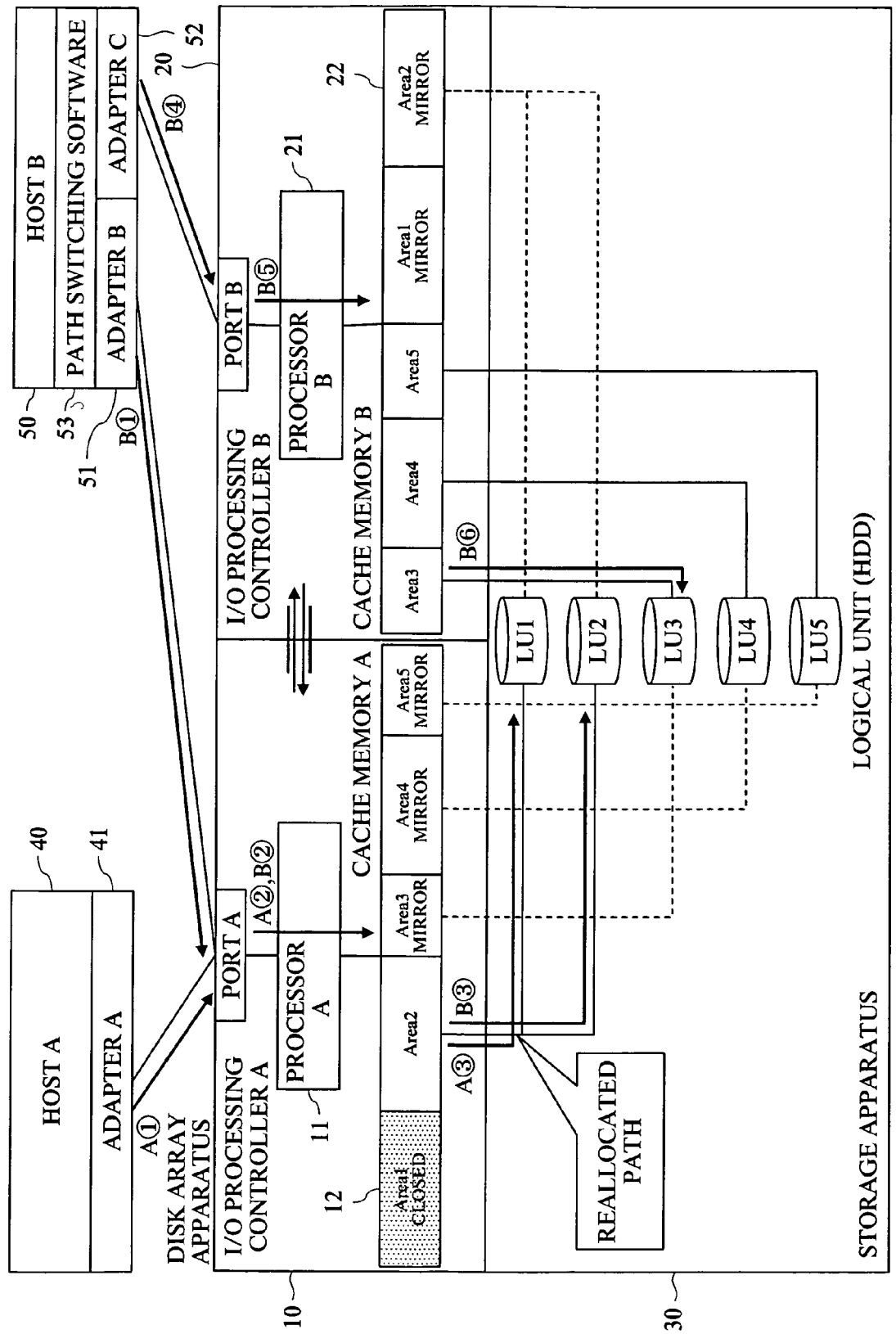
FIG. 6 is a diagram showing one example of an input/output route when a failure has occurred at a memory area Area1 in the disk array apparatus according to the embodiment of the present invention.
Figure 8:
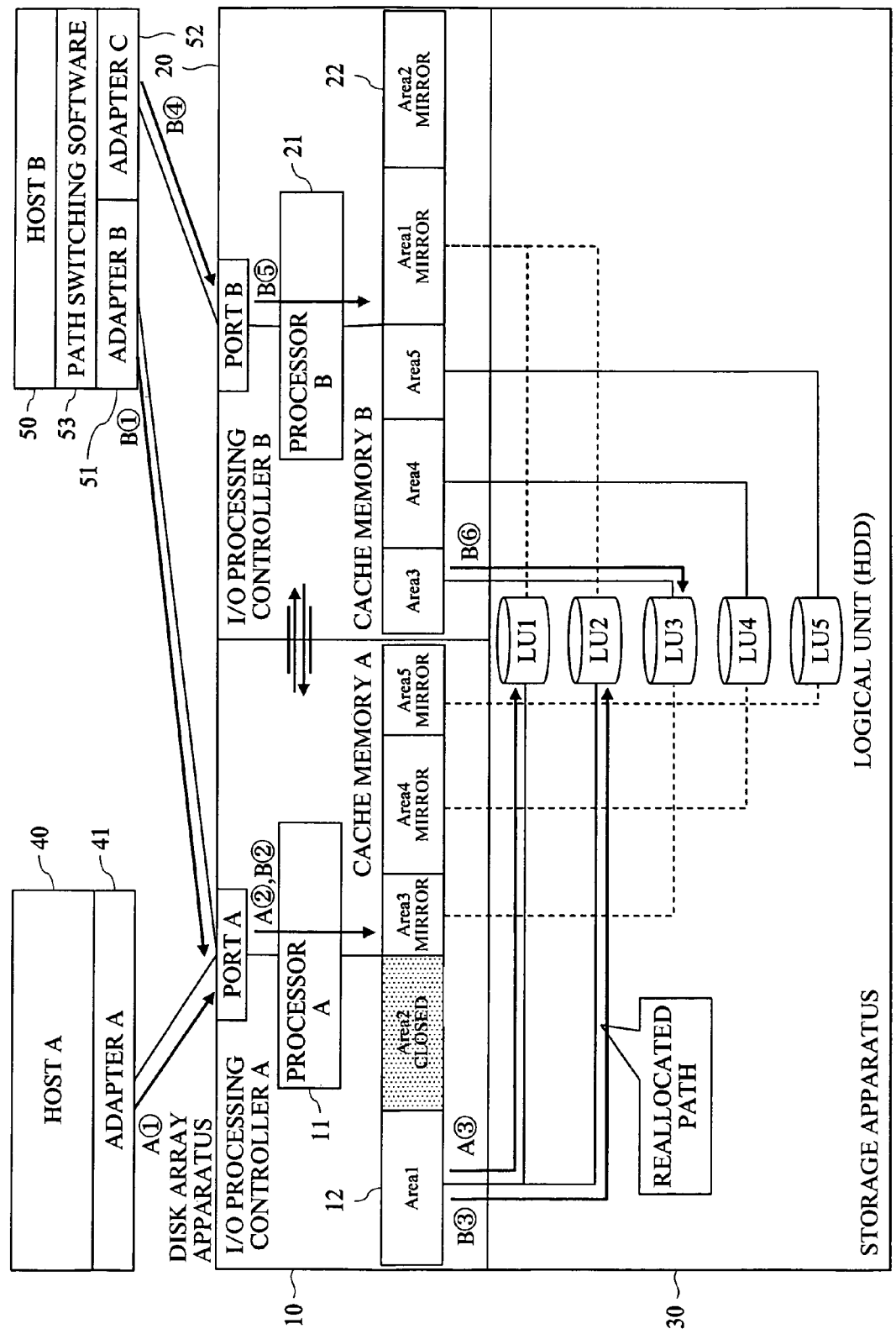
FIG. 8 is a diagram showing one example of an input/output route when a failure has occurred at a memory area Area2 and a load on an I/O processing controller B has been high in the disk array apparatus according to the embodiment of the present invention.

In the example shown in FIG. 1, for example, LU1, LU2, LU3, LU4, and LU5 are set in LU#. LU1 includes default logical memory area "Area1," current logical memory area "Area2," connection port 1 "port A," connection port 2 "–," connection host "host A," and redundant path "absence." This example of LU1 corresponds to a case where a failure has occurred at Area1 and reallocation to Area2 has been done, as described below (FIG. 6). LU2 includes default logical memory area "Area2," current logical memory area "Area1," connection port 1 "port A," connection port 2 "port B," connection host "host B," and redundant path "presence." This example of LU2 corresponds to a case that a failure has occurred at Area2 and reallocation to Area1 has been done, as described below (FIG. 8). The others are shown in FIG. 5.

<Input/Output Route When Failure Occurs at Memory Area Area1>

Figure 7:
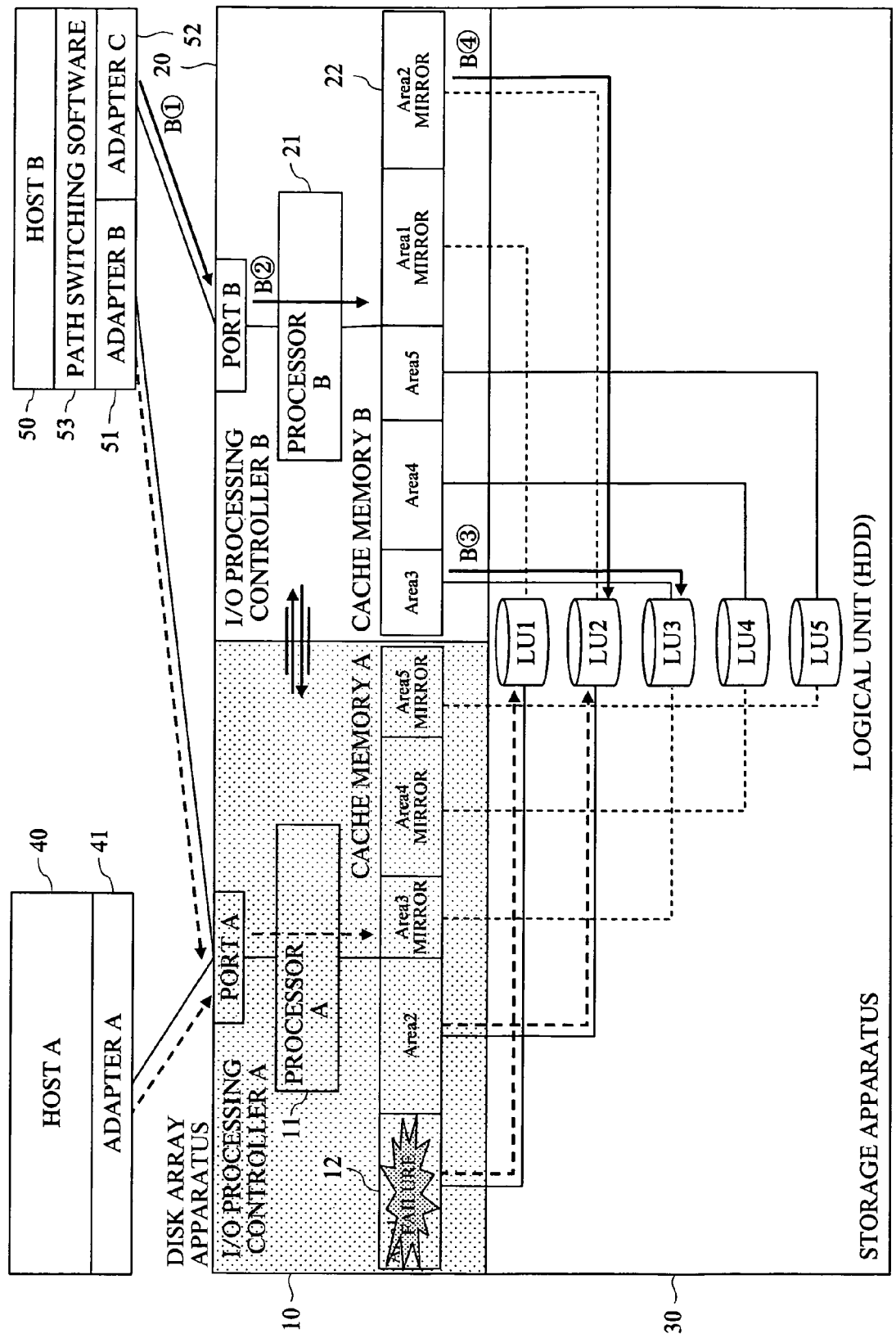
FIG. 7 is a diagram showing one example of an input/output route when a failure has occurred at a memory area Area1 in a disk array apparatus of a conventional art with respect to the present invention.

With reference to FIG. 6 and FIG. 7, one example of input/output route when a failure occurs at the memory area Area1 will be described. FIG. 6 is a diagram showing one example of input/output route when a failure occurs at the memory area Area1 in the disk array apparatus shown in FIG. 1, and FIG. 7 is a diagram showing one example of input/output route when a failure occurs at the memory area Area1 in a conventional disk array apparatus.

In the conventional disk array apparatus, as shown in FIG. 7, for example, in a route from the adapter 41 of the host 40 to the logical unit LU1 via the port A of the I/O processing controller 10, the processor 11, and the memory area Area1 of the cache memory 12, when a failure occurs at the memory area Area1, such a problem arises that it is necessary to close the I/O processing controller 10 having the cache memory 12 including Area1 where the failure has occurred and it makes the I/O processing impossible to be continued.

When the I/O processing controller 10 having the cache memory 12 including the memory area where the failure has occurred is closed and a processing is taken over to the I/O processing controller 20 of the other system like the host 50 having two adapters 51 and 52, such a problem arises that the load due to an I/O processing is clustered to one I/O processing controller 20, and it causes performance degradation.

In the disk array apparatus of the present embodiment, therefore, by logically dividing the cache memory 12 or 22 into a plurality of memory areas and allocating the divided memory areas to respective logical units, a memory area Area1 where a failure has occurred is reallocated to other normal memory area Area2 so that only the memory area Area1 where a failure has occurred can be closed, as shown in FIG. 6. Therefore, since it is unnecessary to close the whole cache memory 12 where the failure has occurred, it is unnecessary to stop access from the host 40 or 50 to the memory areas other than the memory area Area1 where the failure has occurred.

In other words, as shown in FIG. 6, in a route from the adapter 41 of the host 40 to the logical unit LU1 via the port A of the I/O processing controller 10, the processor 11, and the memory area Area1 of the cache memory 12, when a failure occurs at the memory area Area1, the memory area Area1 where the failure has occurred is reallocated to another normal memory area Area2, so that an I/O processing can be continued using the reallocated memory area Area2. A procedure of a processing from failure occurrence at the memory area Area1 to reallocation of the normal memory area Area2 will be described below (FIG. 11).

Note that, in a route from the adapter 51 of the host 50 to the logical unit LU2 via the port A of the I/O processing controller 10, the processor 11, and the memory area Area2 of the cache memory 12 and in a route from the adapter 52 of the host 50 to the logical unit LU3 via the port B of the I/O processing controller 20, the processor 21, and the memory area Area3 of the cache memory 22, processings are performed similarly.

<Input/Output Route when Failure Occurs at Memory Area Area2 and I/O Processing Controller B Gets High Load>

With reference to FIG. 8, one example of input/output route when a failure occurs at the memory area Area2 and the I/O processing controller B gets a high load will be described. FIG. 8 is a diagram showing one example of input/output when a failure occurs at the memory area Area2 and the I/O processing controller B gets a high load.

As shown in FIG. 8, for example, there is a method where, in a route from the adapter 51 of the host 50 to the logical unit LU2 via the port A of the I/O processing controller 10, the processor 11, and the memory area Area2 of the cache memory 12, when a failure occurs at the memory area Area2, a processing is taken over from the I/O processing controller 10 having the cache memory 12 including the memory area Area2 where the failure has occurred to the I/O processing controller 20 of the other system. However, when a load for an I/O processing on the I/O processing controller 20 is high, taking-over cannot be performed.

Like the case shown in FIG. 6, therefore, regarding the cache memory 12 including the memory area Area2 where the failure has occurred, the memory area Area2 where the failure has occurred is reallocated to another normal memory area Area1 so that an I/O processing can be continued using the reallocated memory area Area1. A procedure performed from the failure occurrence in the memory area Area2 to load determination of the I/O processing controller 20 of the other system, and the reallocation to the normal memory area Area1 in the I/O processing controller where the failure has occurred will be described below (FIG. 11).

Note that, in a route from the adapter 52 of the host 50 to the logical unit LU3 via the port B of the I/O processing controller 20, the processor 21, and the memory area Area3 of the cache memory 22, and in a route from the adapter 41 of the host 40 to the logical unit LU1 via the port A of the I/O processing controller 10, the processor 11, and the memory area Area1 of the cache memory 12, processings are performed similarly.

<Read Operation>

Figure 9:
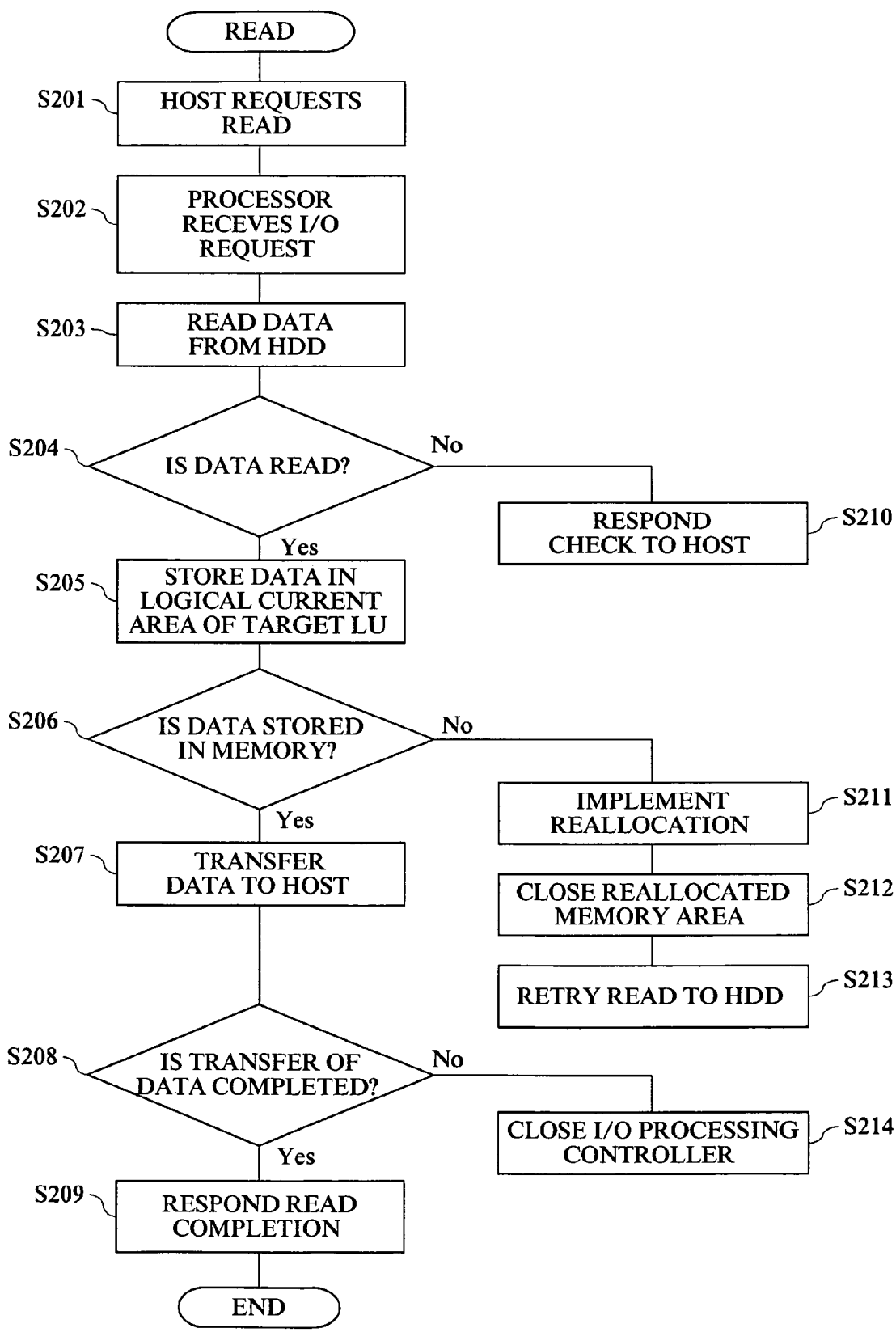
FIG. 9 is a diagram showing one example of a processing procedure of a read operation in the disk array apparatus according to the embodiment of the present invention.

With reference to FIG. 9, one example of processing procedure of a read operation will be described. FIG. 9 is a flowchart showing one example of processing procedure of a read operation.

First, when a read request is issued from the host 40 or 50 (S201), the processor 11 or 21 in the I/O processing controller 10 or 20 receives I/O requests (S202). The processor 11 or 21 reads data from an HDD (hard disk) (S203). Here, the processors 11 or 21 determines whether or not read of the data is completed (S204). As the result of the determination, when the read of the data can be done (Yes), the processor 11 or 21 stores the data in the current logical memory area of a target LU (logical unit) of LU1 to LU5 of the target cache memory 12 or 22 referring to the LU information management table (S205). On the other hand, when the read of the data cannot be done (No), the processor 11 or 21 responds error check to the host 40 or 50 (S210).

Subsequently, the processor 11 or 21 determines whether or not the data is stored in the current logical memory area (S206). As the result of the determination, when the data can be stored in the current logical memory area (Yes), the processor 11 or 21 transfers the data that has been stored in the current logical memory area to the host 40 or 50 (S207). On the other hand, when the data cannot be stored in the current logical memory area (No), such a fact indicates a possibility that a failure has occurred in the memory area, and then the processing shifts to S211. After the memory area is reallocated to another memory area at S211, the memory area is closed (S212), and retry of read to the HDD is performed (S213). The details of the reallocation at S211 and the details of closing at S212 will be described below (FIG. 11).

After the processing at S207, the processor 11 or 21 determines whether or not data transfer is completed (S208). As the result of the determination, when the data transfer is completed (Yes), the processor 11 or 21 responds read completion to the host 40 or 50 (S209). On the other hand, when the data transfer is not completed (No), the processor 11 or 21 close the I/O processing controller 10 or 20 (S214).

As described above, in response to the read request from the host 40 or 50, the read operation can be performed while determination is made about whether or not a failure has occurred on each of the read stage of data from the HDD, storing stage of the data to the cache memory 12 or 22, and the transfer stage of the data to the host 40 or 50, especially considering a case that a failure has occurred at a memory area in the cache memory 12 or 22.

<Write Operation>

Figure 10:
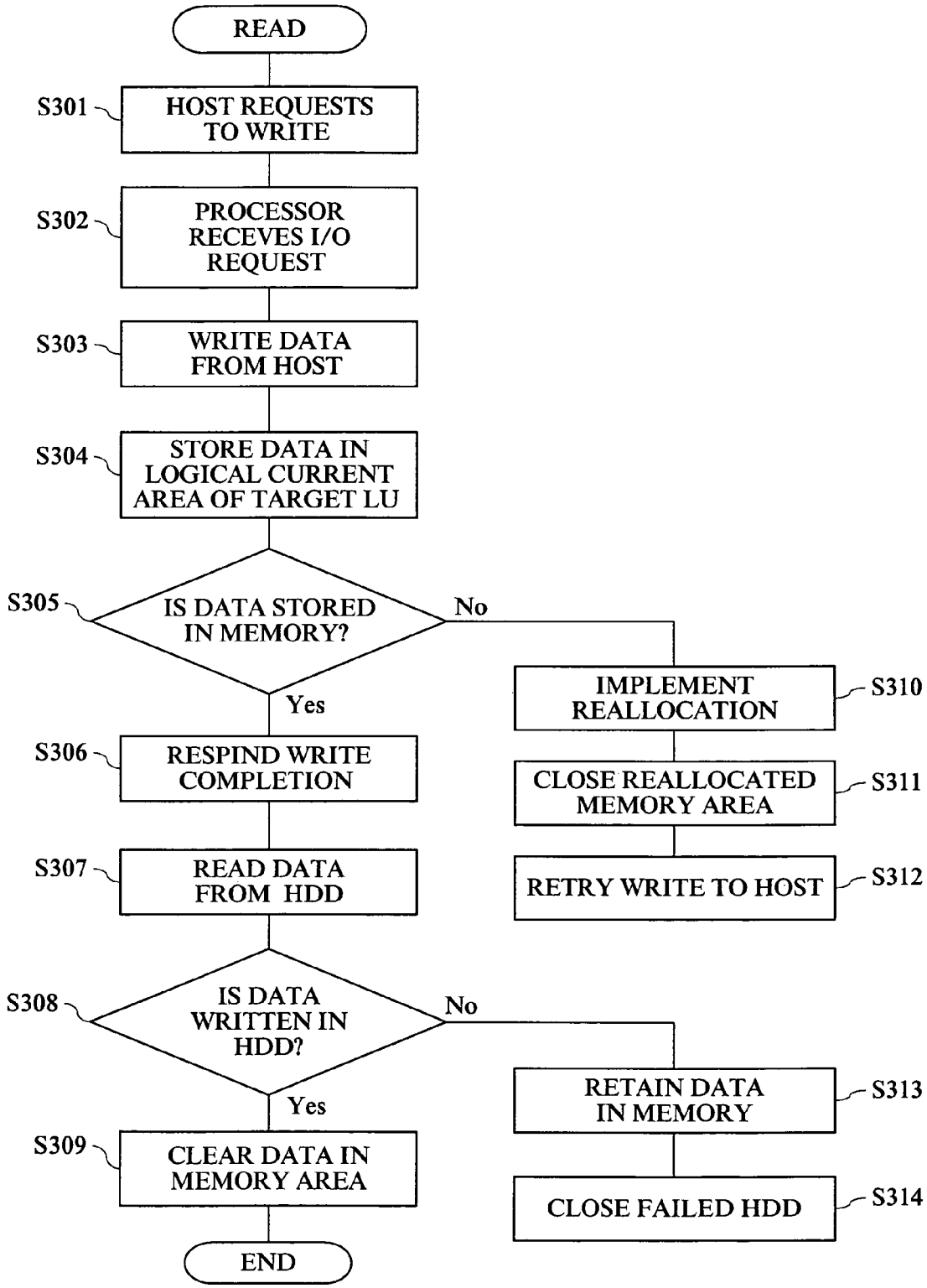
FIG. 10 is a diagram showing one example of a processing procedure of a write operation in the disk array apparatus according to the embodiment of the present invention.

With reference to FIG. 10, one example of processing procedure of a write operation will be explained. FIG. 10 is a flowchart showing one example of processing procedure of the write operation.

First, when a write request is issued from the host 40 or 50 (S301), the processor 11 or 21 in the I/O processing controller 10 or 20 receives an I/O request (S302). Then, the processor 11 or 21 writes data from the host 40 or 50 (S303) and store the data in the current logical memory area of a target LU (logical unit) of LU1 to LU5 of the cache memory 12 or 22, referring to the LU information management table (S304).

Subsequently, the processor 11 or 21 determines whether or not the data is stored in the current logical memory area (S305). As the result of the determination, when the data can be stored in the current logical memory area (Yes), the processor 11 or 21 responds write completion to the host 40 or 50 (S306). On the other hand, when the data cannot be stored in the current logical memory area (No), such a fact indicates a possibility that a failure has occurred in the memory area, and then the processing shifts to S310. After the memory area is reallocated to another memory area at S310, the memory area is closed (S311), and retry of write to the host 40 or 50 is performed (S312). The details of the reallocation at S310 and the closing at S311 will be described below (FIG. 11).

After the processing at S306, the processor 11 or 21 transfers the data to an HDD (S307). The processor 11 or 21 determines whether or not the data is stored in the HDD (S308). As the result of the determination, when the data can be stored in the HDD (Yes), data in the memory area is cleared (S309). On the other hand, when the data cannot be stored in the HDD (No), the data is retained at the memory area (S313) and the failed HDD is closed (S314).

As described above, in response to a write request from the host 40 or 50, the write operation is performed while determination is made about whether or not a failure has occurred in each of the storing stage of data in the cache memory 12 or 22 and the transfer stage of the data to the HDD, especially considering a case that a failure has occurred at a memory area in the cache memory 12 or 22.

<Processing when Failure Occurs at Part of Cache Memory>

With reference to FIG. 11, one example of processing procedure when a failure occurs at a part of a cache memory will be described. FIG. 11 is a diagram showing one example of processing procedure when a failure occurs at the part of the cache memory.

First, when a failure occurs in a memory area, the processor 11 or 21 determines whether or not the cache memory 12 or 22 including the memory area where the failure has occurred can be identified (S401). As the result of the determination, when the cache memory 11 or 22 can be identified (Yes), the processor 11 or 21 identifies a memory address (S402). On the other hand, when the cache memory 12 or 22 cannot be identified (No), the processor 11 or 21 performs a closing processing on the I/O processing controller 10 or 20 (S411).

Subsequently, after the processing at S402, the processor 11 or 21 determines whether or not the memory address of the cache memory 12 or 22 where the failure has occurred can be identified (S403). As the result of the determination, when the memory address can be identified (Yes), the processor 11 or 21 searches for the logical memory area management table (S404). On the other hand, when the memory address cannot be identified (No), the processor 11 or 21 performs a closing processing on the I/O processing controller 10 or 20 (S411).

Furthermore, after the processing at S404, the processor 11 or 21 refers to the logical memory area management table to determine whether or not the memory area is present (S405). As the result of the determination, when the memory area is present (Yes), the processor 11 or 21 refers to the LU information management table to check allocated LUs (S406). On the other hand, when the memory area is not present (No), the processor 11 or 21 reports a failure to the host 40 or 50 (S412).

Subsequently, after the processing at S406, the processor 11 or 21 refers to the connection port 2 and the redundant path on the LU information management table to determine whether or not an upper path and a redundant path to the host 11 or 21 is present (S407). As the result of the determination, when the upper path and the redundant path is present (Yes), the processor 11 or 21 determines whether a load on the I/O processing controller 20 or 10 of the other system (where the failure is not present) is high (S413). On the other hand, when any upper path and redundant path are not present (No), the processor 11 or 21 checks a usage rate of the memory areas in the same I/O processing controller 10 or 20 (including the failure) (S408).

Furthermore, after the processing at S408, the processor 11 or 21 refers to the current logical memory area of the LU information management table to reallocate the LU (S409) and close the memory area where the failure has occurred (S410). In the reallocation of the LU, a memory area set to the current logical memory area of the LU information management table is allocated. For example, in FIG. 5, Area2 instead of Area1 is allocated on LU1. In the closing of the memory area where the failure has occurred, the fail bit of a corresponding memory area of the logical memory area management table is set with "1" and the memory area is closed so that the memory area is disabled in an I/O processing from a host. For example, in FIG. 4, "1" is set for fail bit in Area1.

As the result of the determination at S413, when a load on the I/O processing controller 20 or 10 of the other system is high (Yes), the processing shifts to S408. On the other hand, when the load on the I/O processing controller 20 or 10 of the other system is not high (No), switching to a mirror memory area in the I/O processing controller 20 or 10 of the other system is performed (S414) and the processing shifts to S410. For example, in FIG. 1, when switching to the mirror memory area in the I/O processing controller 20 or 10 of the other system is performed, switching is performed: from Area1 or Area2 of the I/O processing controller 10 to Area1 mirror or Area2 mirror of the I/O processing controller 20; or from Area3, Area4, or Area5 of the I/O processing controller 20 to Area3 mirror, Area4 mirror, or Area5 mirror of the I/O processing controller 20.

Thus, when a failure occurs at a memory area of a part of the cache memory 12 or 22, processings for reallocation of LU and for closing a memory area where the failure has occurred can be performed considering the upper path to the host 40 or 50 and the redundant path to the host 40 or 50, and the load on the I/O processing controller 20 or 10 of the other system.

Herein, through both the upper path/the redundant path with the host 40 or 50 and the load on the I/O processing controller 20 or 10 of the other system are considered, the processings for reallocation of LU and for closing a memory area where the failure has occurred can be performed considering only one of the upper path/the redundant path with the host 40 or 50 and the load on the I/O processing controller 20 or 10 of the other system.

<Processing Performed when Returning to Original Memory Area Allocation in Failure Recovery>

FIG. 12 explains one example of processing procedure performed when returning to original memory area allocation at in a failure recovery. FIG. 12 is a diagram showing one example of processing procedure performed when returning to original memory area allocation in the failure recovery.

First, a maintenance person closes an I/O processing controller 10 or 20 including a memory area where a failure has occurred to replace the cache memory 12 or 22 by another and perform maintenance (S501). In this case, the host 40 or 50 where the memory area is reallocated and which does not include any redundant path must be also stopped during maintenance. Further, the maintenance person inserts an I/O processing controller including a normal memory area into the disk array apparatus to recover the failure (S502).

Subsequently, the maintenance person checks test data to determine whether or not the failure is recovered (S503). As the result of the determination, when the failure is recovered (Yes), he/she clears the fail bit of the logical memory area management table (S504). On the other hand, when the failure is not recovered (No), the maintenance person closes the I/O processing controller (S506). After the processing at S504, the person changes a value of the current logical memory area of the LU information management table to a value of a default logical memory area (S505).

In this manner, the person can perform a processing for returning allocation to an original memory area in a failure recovery by inserting a normal I/O processing controller.

As explained above, according to the present embodiment, in the disk array apparatus provided with the dual cache memories 12 and 22, when a failure occurs at a part of the cache memory 12 or 22, necessity for closing the whole cache memory 12 or 22 where the failure has occurred is eliminated by adopting a configuration for closing only a memory area where the failure has occurred and reallocating the memory area to another memory area of the same cache memory 12 or 22 to continue an I/O processing, so that necessity for stopping access from the host 40 or 50 to the other memory areas other than the memory area where the failure has occurred is eliminated. As a result, when a failure has occurred at a part of the cache memory 12 or 22, a memory area of the I/O processing controller 10 or 20 other than the memory area thereof where the failure has occurred can be utilized without taking over the whole I/O processing to the I/O processing controller 20 or 10 of the other system, and influence of performance degradation can be minimized. Even in the host 40 that does not include a path switching software, continuation of an I/O processing can be made in the I/O processing controller 10 where a failure has occurred at a part of the cache memory 12.

In the foregoing, the invention made by the inventors of the present invention has been concretely described based on the embodiments. However, it is needless to say that the present invention is not limited to the foregoing embodiments and various modifications and alterations can be made within the scope of the present invention.

The disk array apparatus of the present invention can be applied to a technique for continuing an I/O processing when a failure occurs at a part of the cache memories, in particular, in a disk array apparatus having dual cache memories.

What is claimed is:

1. A disk array apparatus comprising:

a plurality of I/O processing controllers for controlling an I/O processing between the I/O processing controller and an upper apparatus; and a storage apparatus storing data obtained according to I/O processings conduced in the plurality of I/O processing controllers, wherein each of the plurality of I/O processing controllers includes: a processor for performing an I/O processing; and a cache memory temporarily storing data obtained according to the I/O processing at the processor;

the cache memory is logically divided to a plurality of memory area; and the storage apparatus includes a plurality of logical units, and the divided memory areas are allocated to respective logical units, when a failure occurs at a part of the cache memory, the processor performs:

identification of an address of the cache memory where the failure has occurred and closes a first memory area of the identified address;

determination about an access state from the upper apparatus to reallocate the logical unit that has been allocated to the first memory area to a second memory area of the cache memory where the failure has occurred based on the result of the determination; and continuation of an I/O processing from the upper apparatus using the reallocated second memory area.

2. The disk array apparatus according to claim 1, wherein, as the access state from the upper apparatus, presence/absence of a redundant path configuration between the upper apparatus and the I/O processing controller having the cache memory where the failure has occurred is determined, and according to the determination, when the redundant path configuration is absent, a usage rate of each memory area of the cache memory where the failure has occurred is checked, and reallocation to a memory area whose usage rate is low according to the result of the check is performed to continue the I/O processing.

3. The disk array apparatus according to claim 2, wherein, when the redundant path configuration is present according to the result of the determination, switching to a cache memory of other I/O processing controller other than the I/O processing controller having the cache memory where the failure has occurred is performed to continue the I/O processing.

4. The disk array apparatus according to claim 1, wherein, as the access state from the upper apparatus, a load state of other I/O processing controller other than the I/O processing controller having the cache memory where the failure has occurred is determined, and when the load is high according to the result of the determination, a usage rate of each memory area of the cache memory where the failure has occurred is checked, and reallocation to a memory area whose usage rate is low according to the result of the check is performed to continue the I/O processing.

5. The disk array apparatus according to claim 4, wherein, when the load is not high according to the result of the determination, switching to a cache memory of other I/O processing controller other than the I/O processing controller having the cache memory where the failure has occurred is performed to continue the I/O processing.

6. The disk array apparatus according to claim 1, wherein, as the access state from the upper apparatus, presence/absence of a redundant path configuration between the upper apparatus and the I/O processing controller having the cache memory where the failure has occurred and a load state of other I/O processing controller other than the I/O processing controller having the cache memory where the failure has occurred are determined, and when the redundant path is absent and the load is high according to the result of the determination, a usage rate of each memory area of the cache memory where the failure has occurred is checked, and reallocation to a memory area whose usage rate is low according to the result of the check is performed to continue the I/O processing.

7. The disk array apparatus according to claim 6, wherein, when the redundant path is absent and the load is not high according to the result of the determination, a usage rate of each memory area of the cache memory where the failure has occurred is checked, and reallocation to a memory area whose usage rate is low according to the result of the check is performed to continue the I/O processing.

8. The disk array apparatus according to claim 6, wherein, when the redundant path is present and the load is high according to the result of the determination, a usage rate of each memory area of the cache memory where the failure has occurred is checked, and reallocation to a memory area whose usage rate is low according to the result of the check is performed to continue the I/O processing.

9. The disk array apparatus according to claim 6, wherein, when the redundant path is present and the load is not high according to the result of the determination, switching to a cache memory of other I/O processing controller other than the I/O processing controller having the cache memory where the failure has occurred is performed to continue the I/O processing.

10. A disk array apparatus comprising:

a plurality of I/O processing controllers for controlling an I/O processing between the I/O processing controller and an upper apparatus; and a storage apparatus storing data obtained according to I/O processings conduced in the plurality of I/O processing controllers, wherein each of the plurality of I/O processing controllers includes: a processor for performing an I/O processing; and a cache memory temporarily storing data obtained according to the I/O processing at the processor;

the cache memory is logically divided to a plurality of memory area; and the storage apparatus includes a plurality of logical units, and the divided memory areas are allocated to respective logical units, when a failure occurs at a part of the cache memory, the processor performs:

identification of an address of the cache memory where the failure has occurred and closes a first memory area of the identified address;

determination about an access state from the upper apparatus to reallocate the logical unit that has been allocated to the first memory area to a second memory area of the cache memory where the failure has occurred based on the result of the determination; and continuation of an I/O processing from the upper apparatus using the reallocated second memory area, wherein, as the access state from the upper apparatus, presence/absence of a redundant path configuration between the upper apparatus and the I/O processing controller having the cache memory where the failure has occurred and a load state of other I/O processing controller other than the I/O processing controller having the cache memory where the failure has occurred are determined, and when the redundant path is absent and the load is high according to the result of the determination, a usage rate of each memory area of the cache memory where the failure has occurred is checked, and reallocation to a memory area whose usage rate is low according to the result of the check is performed to continue the I/O processing, and when the redundant path is present and the load is not high according to the result of the determination, switching to a cache memory of other I/O processing controller other than the I/O processing controller having the cache memory where the failure has occurred is performed to continue the I/O processing.

* * * * *